United States Patent Office 3,751,526
Patented Aug. 7, 1973

3,751,526
PROCESS FOR PRODUCING IMPACT RESISTANT THERMOPLASTIC RESINS
Hotuma Okasaka, Nagoya, Takehiko Okamoto, Chita-gun, Toshimasa Hirai and Masakazu Inoue, Nagoya, and Akira Asama, Nishinomiya, Japan, assignors to Toray Industries, Inc., Tokyo, Japan
No Drawing. Filed Sept. 30, 1970, Ser. No. 76,983
Int. Cl. C08f 19/08, 1/04
U.S. Cl. 260—880 R   5 Claims

ABSTRACT OF THE DISCLOSURE

A latex, wherein a diene type rubber is dispersed, is added to an unsaturated monomer, at least 20% of which compries an aromatic unsaturated monomer. Separation of water from the mixture, in which the monomer acts as an extractant with respect to the diene rubber, and then bulk polymerizing the mixture results in the production of an impact resistant resin having many desirable properties.

BACKGROUND OF THE INVENTION

Field of the invention

The present invention relates to a method for producing anti-impact thermoplastic resin, and more particularly, the present invention relates to a method for producing anti-impact thermoplastic resin comprising extract-separating polymer component from diene type rubber form polymer latex containing gel by means of monomer having a double bond, pre-polymerizing the monomer dispersion-solution of rubber form polymer obtained thereby, and thereafter subjecting the pre-polymerized monomer dispersion to bulk-polymerization.

Description of the prior art

Conventional methods for producing graft polymers include emulsion-graft polymerization, suspension polymerization or bulk-polymerization, of a monomer solution of solid rubber elastomer, and suspension polymerization of an aqueous dispersion of latex form rubber elastomer mixed with monomer (for the latter, refer to the Japanese patent publication No. 13991/1966).

In the above cited emulsion polymerization method, rubber elastomer is directly used in the form of latex, and the adjustment of temperature during polymerization is easy. It is therefore possible to make batch sizes larger which is an advantage; but there are drawbacks such as a great deal of labor is required in the coagulating or drying process. Further, chemicals such as the emulsifier contained in the polymer have undesirable effects on the properties of the obtained polymer.

In the method wherein solid rubber elastomer is dissolved into monomer and the obtained solution is subjected to suspension polymerization or bulk-polymerization, less labor (as compared to the emulsion polymerization process) is required, but the solubility of the monomer and rubber is elastomer is limited, and it is difficult to increase the amount of the rubber elastomer contained in the polymer.

Moreover, the solid rubber elastomer must be dissolved in the monomer and therefore the rubber elastomer to be used must contain no gel, i.e., the rubber elastomer must be a non-cross linked rubber.

With regard to suspension polymerization of an aqueous dispersion in which latex form rubber elastomer and monomer are present, it is not necessary in this method to dissolve rubber elastomer into monomer. Therefore, as compared to the other above mentioned methods, in this method it is possible to increase the amount of rubber elastomer in the polymer.

However, when the amount of rubber elastomer contained in the polymer is increased, the viscosity of the system is increased and the dispersion system becomes unstable. It thus becomes difficult to attain the same yield as the yield generally attained by emulsion polymerization.

There is another conventional method, according to which latex form rubber elastomer is mixed along with a monomer, mainly methylmethacrylate, and the obtained mixture is directly subjected to mass polymerization without separating water therefrom (refer to Japanese patent publication No. 20,465/1968). In this method, the water content contained in the latex is evaporated, and removed by ventilation, after polymerization. Therefore emulsifier and other chemicals contained in the latex remain in the polymer, having an adverse effect on the physical properties thereof. Further, when a large amount of latex is used, the separation of all of the water contained therein becomes difficult.

Therefore, the object of the present invention is to provide a method for producing thermoplastic resin having excellent anti-impact property and more particularly, to provide a method for producing thermoplastic resin, having excellent physical properties including impact resistance, according to which complicated after-treatment for separating graft polymer after the termination of polymerization is rendered unnecessary.

SUMMARY OF THE INVENTION

The method of the present invention is a method for producing impact resistant thermoplatic resin, wherein more than 70% by weight of a diene type rubber polymer is dispersed as particles of 0.1 to 10μ. This method comprises adding, to 100 parts by weight of diene type rubber latex (based on the solid portion of the latex of which the gel content, the proportion of the solid rubber matter which is in gel form, is more than 50% by weight); 10 to 2000 parts by weight of an unsaturated monomer or a mixture of unsaturated monomers consisted of more than 20% by weight of at least one aromatic unsaturated monomer and not more than 80% by weight of at least one non-aromatic unsaturated monomer capable of being copolymerized with said aromatic unsaturated monomer, extracting said diene type rubber polymer from the latex, separating water to obtain a composition of unsaturated monomer and diene type rubber polymer dispersed therein, and bulk-polymerizing the composition.

DETAILED DESCRIPTION OF INVENTION AND DESCRIPTION OF PREFERRED EMBODIMENTS

Diene type rubber latex as used in the present invention contains from 50 to 100% of the diene rubber as a gel comprised of homo or copolymer of diene monomers, consisting of at least 60% by weight of conjugated diene compounds represented by the general formula

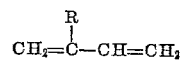

wherein R is H, $CH_3$— or —Cl, and not more than 40% of monomers such as styrene, acrylonitrile and methylmethacrylate. Examples of the rubber latex preferably used in the present invention are polybutadiene, polyisoprene, polychloroprene, butadiene-styrene copolymer, butadiene-acrylonitrile copolymer, butadiene-styreneacrylonitrile terpolymer, butadiene methylmethacrylate copolymer and the like.

The "gel component," "gel ratio," or "gel content" as used in this specification is measured in the following manner.

100 cc. of toluene is added in 1 g. of the diene type rubber polymer from the latex and said rubber polymer is dissolved at 30° C. in 24 hours. The solution is filtered at 30° C., and the filter cake is washed thoroughly with toluene. The weight of the insoluble portion is then measured.

The percentage by weight of the insoluble portion against the rubber sample may be represented as "gel ratio," "gel component," or "gel content."

The reason why cross linked diene type rubber latex containing more than 50% of gel component is used in the present invention is that in order to render the rubber modified thermoplastic resin impact resistant, it is necessary that the rubber particles be dispersed in the resin phase with appropriate mutual solubility.

Therefore in the extraction process of the method of this invention, it is preferable that the rubber be dispersed in the unsaturated monomer in such a state that the particle size of said rubber polymer in the latex is substantially retained through the extraction and water separation phases of the process.

It is possible to appropriately coagulate the dispersed polymer particles in the subsequent polymerization stage of the process so that the preferable rubber particle size is attained.

The control of particle size in the extraction process is not easy from the technical point of view. It is therefore preferable to retain the particle size of the polymer particles in the latex during the extraction process.

For this reason, it is necessary to use cross linked diene type rubber having a gel content of more than 50%. Such a highly cross linked rubber also contributes to the falling ball impact strength of the resin product.

There is no severe restriction on the rubber particle size in the rubber latex, but generally speaking, a rubber latex containing rubber particles of a grain size of from 0.05 to 1µ is preferably used in the present invention.

Aromatic unsaturated monomer to be used in the method of the present invention is represented by the following general formula;

GENERAL FORMULA

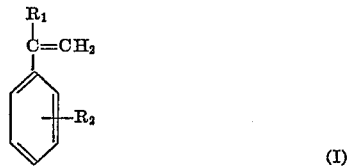

(I)

(wherein $R_1$ is hydrogen or $CH_3$—; $R_2$ is hydrogen, $CH_3$ or Cl).

Examples of such aromatic unsaturated monomer include, styrene, α-methylstyrene, vinyl toluene and chlorostyrene.

The copolymerizable unsaturated monomer to be used along with the aromatic unsaturated monomers given above, can be represented by the general formula given below;

GENERAL FORMULA

(II)

(wherein $R_3$ is hydrogen or $CH_3$; $R_4$ is —CN, or —$COOR_5$ wherein $R_5$ is an alkyl radical having from 1 to 4 carbon atoms).

Examples of the copolymerizable unsaturated monomers represented by the above given General Formula II include acrylonitrile, methacrylonitrile, methacrylic acid ester, acrylic acid esters.

In the extraction process, it is possible to use at least one unsaturated monomer selected only from the aromatic Compounds I. On the other hand, it is also possible to use a mixture prepared by mixing monomer selected from the compounds represented by the General Formula I along with monomer selected from the compounds represented by the General Formula II.

However, generally speaking, it is preferable that the aromatic monomer (I) should be the main component, and the amount of the unsaturated monomer (II) should not be more than 40% by weight, or more preferably not more than 30% by weight based on the amount of the total monomer.

It is also possible that in the extraction process step only a part of the unsaturated monomer may be used. After the extraction and separation of water, additional monomer may be added to the rubber monomer mixture. This alternative is especially useful when it is intended to produce thermoplastic resin having a low aromatic monomer (I) content. Then the extraction may be carried out with only the aromatic monomer (I); after extraction and water separation, the resultant mixture may then be diluted with the non-aromatic monomer (II).

The amount of the unsaturated monomer to be added in the extraction process of the present invention is usually from 10 to 2000 parts by weight based on 100 parts by weight of the latex (solid component).

When the amount of the monomer is less than the above specified range, the rubber polymer cannot be extracted from the latex. Even if it is possible to carry out the extraction and to separate the water therefrom, the resultant mixture does not take the form of a dispersion but rather forms a paste because the amount of rubber is too large.

It is not impossible from the technical point of view to use more of the unsaturated monomer than that specified above but it is preferable to do so in that the mechanical properties of the obtained resin suffer because the rubber content is too small.

Generally, in the process of the present invention when the gel-containing rubber latex and unsaturated monomer are mixed at the above mentioned ratios and sufficiently stirred, a coagulating agent for lowering the emulsifying effect such as inorganic acid or inorganic salt is added to the mixture. This causes a transfer of the rubber polymer-containing gel portion perfectly into the unsaturated monomer layer. The water phase separates out, and the separated water phase is removed, such as by centrifugation.

The temperature at which said extraction is carried out is not seriously restricted. Preferably it is from 0° C. to room temperature.

When unsaturated monomer is used in proportions such as specified above and rubber polymer containing more than 50% of gel is used, the rubber particles of the latex are homogeneously dispersed without being coagulated or broken in the unsaturated monomer phase.

The rubber polymer containing more than 50% of gel is swollen when it is dipped into a styrene type aromatic monomer or a monomer mixture mainly composed of styrene type aromatic monomer, but it is hardly dissolved and is dispersed while keeping almost the same particle size as it has in the latex.

Therefore, in the present invention the amount of rubber contained in the monomer is not restricted by its solubility, and it is possible to control the concentration of rubber very freely.

The unsaturated monomer composition in which is dispersed the gel-containing rubber particles obtained as above mentioned is then subjected to bulk polymerization.

In bulk polymerization, when the composition is heated under shearing agitation in such a state that graft polymer is hardly grown on the surface of the rubber particles, the rubber particles are coagulated.

However, once the surfaces of the rubber particles are covered with a graft polymer layer to some extent, even if the rubber particles are contacted with each other, coagulation of the rubber particles hardly takes place.

If coagulation of rubber particles occurs after the surfaces of rubber particles are covered with a graft polymer layer to some certain extent, it is possible to again disperse these rubber particles by means of mechanical kneading the polymer product.

However, when the particles of rubber polymer are coagulated or broken before formation of a certain amount of graft polymer the polymer cannot be easily redispersed even by mechanical mixing means following the termination of polymerization.

The progress of the coagulation in the initial stage of the bulk polymerization largely depends upon the kind of the unsaturated monomer used. For example, when a composition containing only aromatic unsaturated Compound I as the monomeric material is subjected to bulk polymerization, even if the rubber particles are covered by graft polymer to a relatively large extent, coagulation of the rubber particles can occur. It can be said that in such a case, coagulation of rubber particles is apt to take place. In other words the polymerization velocity in the initial stage of the bulk polymerization process hardly affects the progress of the coagulation of the rubber particles.

On the other hand when the rubber particles are dispersed in a mixture of aromatic monomer (I) and non-aromatic monomer (II), coagulation of rubber particles does not proceed as rapidly. However, when the velocity of the bulk polymerization is low, the coagulation progresses more easily, i.e. the velocity of the polymerization does affect largely the coagulation of the rubber particles.

However, as a matter of fact, in both of the above cases the progress of the coagulation is most affected by the extent of the formation of a graft polymer layer on the surfaces of the rubber particles. It can also be said that the rate of the graft polymerization of the unsaturated monomer onto the rubber polymer is increased in parallel with the conversion rate in the polymerization if other conditions are fixed. Therefore the coagulation of the rubber particles can be generally said to depend on the velocity of the graft polymerization at the initial stage thereof, i.e. until a certain amount of graft polymerizing has occurred.

When the conversion of the unsaturated monomer reaches 10% by weight, the surface of the rubber polymer is covered by graft polymer sufficient to prevent coagulation. Accordingly the coagulating of the rubber particles can be controlled by regulating the conversion velocity in the first stage of the graft polymerization i.e. until the conversion of the monomer reaches 10% by weight.

The above mentioned difference in the progress of the coagulation of the rubber particle based on the proportion of unsaturated non-aromatic monomer used is considered to depend upon the difference in the solubility of the diene type rubber polymer in a polymer derived from the unsaturated monomer (I) and that from a mixture of the unsaturated monomers (I) and (II). By making use of this phenomenon the grain size of the rubber particles dispersed in the finally obtained resin can be controlled.

When the composition consisting of the diene type rubber polymer having the same particle size as in the latex originally used and the unsaturated monomer is subjected to bulk polymerization, it is possible to select the polymerization conditions so as either to prevent the coagulation of the rubber particles or to promote it in order to construct a more preferable size of rubber particle.

With respect to the resin produced by using the aromatic unsaturated monomer represented by Formula I alone, the largest impact strength is attained whe more than 70% by weight of the rubber polymer dispersed in the resin has a particle size in the range 1.0 to 10μ. Therefore in this case it is necessary to control the velocity of polymerization at the initial stage of bulk polymerization so that the rubber particles are permitted to coagulate to the desired extent. For this purpose the velocity of the bulk polymerization is preferably controlled at 2.5–30%/hr. until the conversion reaches more than 10% by weight.

When the velocity at the initial stage of bulk polymerization is less than 2.5%/hr., the coagulation progresses excessively and the rubber particles grow too large. This is undesirable in view of the mechanical properties of the resin thus obtained.

On the other hand, when the initial velocity of the bulk polymerization is more than 30%/hr., it is not necessarily impossible to coagulate rubber particles to some extent, but it is difficult to attain a preferred particle size. Such a polymerization velocity is difficult to adjust, however, and therefore not practical.

In regard to the resin produced by using, as monomers, a mixture of aromatic monomer represented by Formula I and other copolymerizable monomer represented by Formula II, the preferred grain size of rubber particles is 0.1 to 1.0μ, for good impact resistance and other desirable physical properties. The range of particle size is almost the same as that in rubber latex usually used in the present invention. Therefore in this case it is substantially unnecessary to coagulate rubber particles during bulk polymerization.

As mentioned above, on using such a monomer mixture in the present process the coagulation of rubber particles proceeds rather slowly.

However, the initial velocity of bulk polymerization is preferably controlled at more than 5%/hr. until the conversion reaches 10% by weight. When the initial velocity is lower than 5%/hr., the rubber particles coagulate excessively to produce unpreferably large rubber particles and therefore the impact resistance of the finally obtained resin is deteriorated. The upper limit of the initial velocity is 30%/hr. from the practial point of view.

When rubber latex having an average particle size of less than 0.1μ is used in the present process, the rubber particles are coagulated so as to become the preferable particle size as mentioned above. This adjustment of the particle size can be attained by lowering the initial velocity of the bulk polymerization.

It is possible through the utilization of the behavior of rubber particles as mentioned above to produce a predetermined distribution of rubber particle size of the rubber contained in the obtained resin.

Thus when the grafted rubber latex whose grafting ratio is at least 5% is used in a predetermined ratio together with ordinary rubber latex (gel content more than 50%) and at the same time the initial velocity of the bulk polymerization is controlled so as to promote the coagulation of the rubber particles, a resin having a predetermined distribution of rubber particles can be easily produced.

In the process of the present invention, as long as the conversion of the unsaturated monomer is lower than 10% by weight, it is possible to promote or inhibit the coagulation of the rubber particles. However, once the conversion becomes more than 10%, the rubber particles are almost covered by graft polymer and thereafter the coagulation of the rubber particles is hardly affected by conditions of bulk polymerization. Therefore, after the conversion of unsaturated monomer reaches more than 10% by weight, the polymerization conditions can be freely selected.

In the bulk polymerization stage of this process, a homo- or co-polymerization of unsaturated monomers is the primary reaction. At the same time however, graft polymerization onto the rubber polymer occurs and the so-called resin phase is thus constructed.

The bulk polymerization is continued until all unsaturated monomers are polymerized.

The latter phase of the bulk polymerization process can be conducted either continuously with the initial phase as a controlled part of the bulk polymerization process or it can be conducted separately therefrom in another reaction vessel.

What is cited here as "grafting ratio" is determined as follows: 1 g. of the sample is dipped into 100 cc. of dimethyl formamide and refluxation of the dimethyl formamide solution is carried out at 70° C. for three hours, after which the insoluble portion is separated, washed and dried. The "grafting ratio" is the $$\frac{\text{weight of insoluble portion} - \text{weight of rubber component}}{\text{weight of rubber component}} \times 100$$

The term "conversion" used herein is defined as the ratio of (percentage by weight) the amount of polymerized monomer to the total amount of monomer supplied to the process.

In the process of the present invention a polymerization catalyst may be used. The catalyst includes organic peroxides such as benzoyl peroxide,
cyclohexanoneperoxide,
t-butylperoxide,
cumenehydroperoxide,
or azo compounds such as
azobis-isobutylonitrile,
azobis-cyclohexane nitrile, etc.

When such a catalyst is used, the polymerization temperature is from 50 to 200° C.

In the process of the present invention, thermal polymerization takes place easily, and in view of the quality of the finally obtained resin, thermal polymerization (without a catalyst) is preferred to polymerization using a catalyst.

When bulk polymerization is carried out thermally the temperature is 70 to 250° C. By selection of an appropriate polymerization temperature heat polymerization can be accomplished within the same polymerization time as in the case in which a catalyst is employed.

It is not preferable to raise the reaction temperature to above 250° C. because the quality of the finally obtained resin is deteriorated.

The finally obtained polymer is preferably composed of from 1 to 35% by weight of rubber component, and from 99 to 65% by weight of resin component. However, when only aromatic unsaturated monomer alone, represented by the General Formula I, is used as the monomer, it is preferable that the finally obtained polymer should be composed of from 3 to 20% by weight of rubber component and from 80 to 97% by weight of resin component.

When less than the amount of monomer necessary to attain the desired resin-rubber proportion in the product is used in the extraction process fresh unsaturated monomer must be added to the reaction media before or during the bulk polymerization stage.

Polymerized resin is extruded from the lower part of the polymerization vessel in the molten state and thereafter pelletized.

If necessary the product can be exposed to reduced pressure before pelletization to remove remaining monomer or water.

It is almost impossible to carry out the bulk polymerization process in a perfectly anhydrous state (some of the water content contained in the latex is always mixed with the extracted rubber). However, it is not absolutely necessary to remove all water from the system prior to polymerization so long as a suspension is not formed in the polymerization system and/or other problems attributable to water are not brought about.

An appropirate amount of "adjusting agent," such as mercaptane, may be added to the reaction system at any stage of the process. Such an additive may be used to adjust the degree of polymerization or to control the graft and homo- or co-polymerization of unsaturated monomer.

It is possible to carry out the extraction process and bulk polymerization process of the present invention in a continuous manner. When it is desired to carry out the process continuously, one apparatus capable of being used both as mixer and separator can be adopted for the extraction process, and the bulk polymerization can be carried out in a still type continuous polymerization apparatus.

As has been described in the foregoing paragraphs, in accordance with the method of the present invention, the four stages in conventional emulsion polymerization methods, i.e., coagulation, dehydration, drying and extraction, can be simplified into a two stage process, i.e., extraction and separation. Further, in the process of this invention the coagulating agent is hardly contained in the obtained polymer and therefore coloring of the polymer is prevented and physical properties, such as impact strength, are highly improved. These are all distinct advantages of the present invention.

On the other hand, rubber particles dispersed in the resin obtained according to the present process are cross linked, but there is no difficulty attributable thereto in the shaping process.

The following are examples to further illustrate the present invention, but the method of the present invention is not restricted thereby.

EXAMPLE 1

Several mixtures of 1.0 g. of benzoyl peroxide in 125 g. of polybutadiene latex (solid content, 60%, average particle size, 0.25$\mu$, gel content as shown in Table 1) 127.5 g. of acrylonitrile, and 297.5 g. of styrene, were agitated using a four bladed mixer at 500 r.p.m. for 10 minutes.

Thereafter, while continuing the mixing operation, 50 cc. of 0.5% aqueous solution of magnesium sulfate was titrated into each of the mixtures for 30 minutes.

The mixtures were then charged into a centrifugal separator operated at 10,000 r.p.m. for 30 minutes.

The separated upper layer of each mixture (consisting of polybutadiene and monomer) was then charged into a one litre autoclave provided with a four bladed stirrer. After sealing the autoclave with nitrogen gas, each mixture was heated while stirring at 200 r.p.m. to cause graft polymerization at 80° C. for 1.5 hr.

Thereafter the stirring operation was stopped, and the reaction mixture was kept at 150° C. for 5 hours.

The polymers thus obtained were kneaded with 150° C. hot rollers for 15 minutes, and thereafter, shaped by using a 200° C. press-shaping machine (ASTM–D 256–56K).

Izod impact test samples were prepared, and the impact strength thereof was measured. The results of these tests and of certain observations of the characteristics of the products described above are given in Table 2.

Table 1.—Gel content (percent of rubber in latex)

Test No:
1 _____ 30
2 _____ 45
3 _____ 50
4 _____ 80
5 _____ 95

TABLE 2.—PROPERTIES OF PRODUCTS WITH VARIOUS GEL CONTENTS

| Test No. | The state of rubber particle contained in monomer mixture [1] | State of rubber particles contained in the polymer [2] | Impact strength (kg. cm./cm. notch) |
|---|---|---|---|
| 1 | Polybutadiene contained in styrene-acrylonitrile swollen and partially coagulated. | Dispersion not homogeneous; coagulated; not uniform | 4.0 |
| 2 | More dispersed than the sample of Test No. 1, but some coagulation still observed. | Coagulated portion and particles scattered | 6.5 |
| 3 | Several coagulated portions could be observed, but, generally speaking, these are homogeneously suspended and dispersed. | More or less broken rubber particles could be observed, but rubber particles are dispersed in styrene-acrylonitrile resin almost homogeneously. | 13.5 |
| 4 | Polybutadiene suspended and dispersed with the same particle size as latex. | Rubber particles are homogeneously dispersed in resin (the average particle size being 0.3 μ). | 19.5 |
| 5 | do | do | 18.9 |

[1] Observation by naked eye.
[2] Observation by electron-microscope.

As is apparent from these results, it is necessary that the gel comprise at least 50% of the rubber portion of the latex in order to produce a product having good impact strength and wherein the rubber polymer is homogeneously dispersed with the same particle size as latex in the unsaturated monomer.

EXAMPLE 2

In several test runs, 1000 g. of polybutadiene latex having a gel content of 80% (the solid portion thereof being 30%, the average particle size being 0.25μ) and 1200 g. of styrene were charged into a 5 litre kneader. After 10 g. of magnesium sulfate was added as a solution in 200 cc. of water, the mixture was stirred for 10 minutes.

The mixture thus obtained was charged into a centrifugal separator which was then spun at 1500 G for 5 minutes and 630 g. of water was separated. The resultant mixture composed of polybutadiene and styrene was transferred again to the kneader, and kneaded for 2 hours with 500 g. of acrylonitrile and 5 g. of t-dodecyl mercaptan to obtain a liquid mixture.

This mixture was then charged into a 5 litre autoclave equipped with a stirrer, a reflux condenser and a water separator, and, after sealing the autoclave with nitrogen, the mixture was polymerized with stirring at the condition shown in Table 3. The polymer thus obtained was crushed and pelletized by 30 mm. dies. The physical properties observed are shown in Table 3.

TABLE 3

| Run No. | 1 | 2 | 3 | 4 | 5 | 6 | 7 |
|---|---|---|---|---|---|---|---|
| Initiator (parts per 100 parts of a mixture of rubber and monomer) | None | None | None | None | None | [1] 0.03 | [2] 0.01 |
| Polymerization velocity (percent/hr.) until conversion becomes more than 10% by weight | 10 | 4 | 5 | 27 | [3] 33 | 15 | 13 |
| Izod impact strength (kg. cm./cm. notch) | 19.5 | 8.5 | 15.5 | 17.5 | 15.0 | 21.0 | 18.3 |

[1] Benzoyl peroxide.
[2] Cyclohexanone peroxide.
[3] It was very difficult to control the polymerization velocity.

In each run stirring was stopped, when conversion exceed 10% by weight. The polymerization mixture was then kept at 170° C. for 7 hours.

It is apparent from the results shown in Table 3 that it is necessary to carry out the bulk polymerization at a velocity of more than 5%/hr. until the conversion reaches 10% by weight.

EXAMPLE 3

A mixture composed of 25 parts of polybutadiene latex containing 70% of gel (the solid portion thereof being 60% and average particle size being 0.2μ), 20 parts of α-methylstyrene, 29.5 parts of acrylonitrile, and 1 part of t-butylperoxide was extracted in the same manner as in Example 1, and the mixture was then stirred and held at 130° C. for 10 hours.

Thereafter the reaction mixture was kept at 150° C. for 50 hours.

The polymer thus obtained was kneaded at 150° C. on a hot roller for 15 minutes, and the impact strength was measured. It was found 14 kg./cm. notch.

The thermally deforming temperature as was measured in accordance with the method of ASTM–D 648–56 was 103° C.

EXAMPLE 4

The solution prepared by dissolving 0.5 part of cyclohexanoneperoxide in 58.4 parts of methylmethacrylate 18.4 parts of styrene, and 3.2 parts of acrylonitrile was mixed with 28.5 parts of polybutadiene latex (60% gel; the solid portion thereof being 70%, and the average particle size being 0.25μ). Thereafter the extracted mixture of rubber and monomer was heated at 120° C. for one hour while stirring the same, and the reaction mixture was kept at 150° C. for five hours. The polymer thus obtained was kneaded with a hot roller and thereafter the impact strength was measured. It was found to be 10 kg. cm./cm. notch. The light permeability of the product was 89%.

EXAMPLE 5

460 g. of butadiene-acrylonitrile copolymer latex (88% gel; 0.11μ average particle size; ratio of butadiene to acrylonitrile, 75:25), and 460 g. of butadiene latex prepared by grafting styrene-acrylonitrile copolymer (80% gel; ratio of styrene-acrylonitrile to polybutadiene, 30:70; grafting rate thereof being 5%) were mixed, and then 1128 g. of styrene and 484 g. of acrylonitrile were added thereto. Each latex contains 35% of solid portion.

The thus obtained mixture was charged into a 5 litre kneader, and a solution prepared by dissolving 30 g. of magnesium sulfate in 200 cc. of water, was added thereto. This mixture was then stirred for 10 minutes. Thereafter, it was taken out, and dehydrated by using a centrifugal dehydrator at 4000 r.p.m. for five minutes. 90% of the water was removed, and a mixture of rubber form polymer and monomer, with the remaining water, was obtained.

The mixture thus obtained was subjected to bulk polymerization at a polymerization velocity of 4% hr. till the conversion of polymerization went beyond 40% by weight. Thereafter the polymerization temperature was raised as far as 190° C. The resin product had no lustre and its impact strength was 19 kg. cm./cm. notch.

CONTROL 1

Styrene-acrylonitrile was subjected to graft polymerization in the presence of polybutadiene latex (average particle size, 0.25μ, gel content, 85%) in the following mixture:

| Materials: | Parts |
|---|---|
| Polybutadiene latex (solid portion) | 60.0 |
| Styrene | 28.0 |
| Acrylonitrile | 12.0 |
| t-Dodecylmercaptane | 0.15 |
| Sodium laurate | 1.50 |
| Dextrose | 0.5 |
| Cumenhydroperoxide | 0.2 |
| Sodium pyrrolinate | 0.3 |
| Ferrous sulfate | 0.01 |
| Ion exchange water | 150.0 |

The graft polymer latex product was coagulated with magnesium sulfate, and after dehydration, washing and drying operations, 30 parts, by weight, of polymer powder (A) were obtained.

On the other hand, 49 parts by weight of styrene and 21 parts by weight of acrylonitrile were polymerized at a temperature of 65° C., using 1.5 parts by weight of sodium laurate as the emulsifier in accordance with an emulsion polymerization method. 0.2 part by weight of potassium persulfate were used as an initiator, along with 150 parts by weight of water and 0.4 part of t-dodecylmercaptane. The polymer thus obtained was coagulated, dehydrated and dried with magnesium sulfate, and resin powder (B) was obtained.

1.0 part by weight of phenol type stabilizer was added to the above prepared powders (A) and (B), and this mixture was pelletized with an extruder to produce resin pellets.

The physical properties of these mixed resin pellets were as follows:

Melt-viscosity: 4.5×10³ poise (220° C., 0.5 mm. φ× 1 mm. nozzle, 50 kg./cm.²)
Izod impact strength: 6 kg·cm./cm. (notch)
Tensile strength: 400 kg./cm.²

It is apparent therefore that conventional products prepared in accordance with a conventional emulsion graft polymerization method have remarkably inferior physical properties.

On the other hand, when the coloring tendency of the conventional resin pellets was compared with that of the present invention the coloring of the product of the present invention is very little and the whiteness of the product of this invention is remarkable as contrasted with the resin pellets prepared in accordance with the conventional emulsion graft polymerization method.

EXAMPLE 6

460 g. of polybutadiene latex (solid portion, 35%; gel content, 80%; average particle size, 0.40μ) and 500 g. of styrene were mixed and a solution prepared by dissolving 5 g. of magnesium sulfate in 200 cc. of water was added to the mixture.

Thereafter, the mixture was charged into a centrifugal dehydrator, and 93% of the water content was removed by centrifugation of 5,000 G.

1,840 g. of styrene was added to the mixture of polybutadiene, styrene and remaining water, and the mixture was stirred again to produce a homogeneous viscous liquid form mixture.

1,500 g. of this mixture was charged into a bulk polymerization device, provided with a stirrer and reflux condenser. The polymerization process was then carried out under the conditions shown in Table 4.

The conditions for the adjustment of the mixture of rubber and monomer in the respective batches were the same, and the physical properties of the polymer products are shown in Table 4.

The remaining water contained in the mixture was removed from the reflux condenser during polymerization.

After the conversion of polymerization went beyond 10% by weight, the polymerization temperature was raised to 150° C.–190° C. until the polymerization process was terminated.

Impact strength was measured in accordance with the method of ASTM.D-648.

TABLE 4

| Test No. | 1 | 2 | 3 | 4 | 5 | 6 | 7 | 8 |
|---|---|---|---|---|---|---|---|---|
| Initiator (parts/100 parts rubber, monomer) | None | None | None | None | BPO[1] 0.05 | CHPO[2] 0.01 | BPO[1] 0.10 | BPO[1] 0.05 |
| Polymerization temperature before the conversion of polymerization went beyond 10% by weight | 120 | 100 | 95 | 140 | 80 | 100 | 95 | 75 |
| Primary polymerization velocity (percent/hr.) | 10 | 2.5 | 1.5 | 30 | 15 | 7 | 35 | 1.5 |
| Impact strength (kg. cm./cm.) notch | 8.0 | 5.5 | 2.5 | 6.0 | 7.5 | 6.5 | 3.0 | 2.5 |

[1] Benzoylperoxide.
[2] Cyclohexanone peroxide.

From the above given results, it was found out that polymers of relatively excellent impact strength can be obtained by carrying out the polymerization process at a polymerization velocity in the range from 2.5%/hr. to 30%/hr. until the conversion of monomer is more than 10% by weight.

EXAMPLE 7

460 g. of polybutadiene latex (solid portion, 35%; average particle size, 0.25μ, gel content 85 to 90%) and 500 g. of styrene were mixed and a solution, prepared by dissolving 5 g. of magnesium sulfate in 200 g. of water, was added thereto; after mixing the mixture for five minutes, it was charged into a centrifugal dehydrator, and water was removed at 5,000 G.

1,540 g. of styrene was added to the above obtained mixture and the mixture was mixed to produce a homogeneous viscous liquid form mixture.

This homogeneous mixture was charged into the same bulk-polymerization vessel as in Example 1 and polymerization was carried out.

The physical properties of the resin thus obtained are shown in Table 5.

The polymerization was continued until termination by raising the polymerization temperature from 150° C. to 190° C. after the conversion of polymerization went beyond 20% by weight.

From the results given in Table 5, it is apparent that when the velocity of polymerization is controlled so that more than 70% of the rubber particles dispersed in the finally obtained resin are in the particle size range of 1–10μ, a polymer having excellent impact strength can be obtained.

TABLE 5

| Test No. | 9 | 10 | 11 | 12 | 13 |
|---|---|---|---|---|---|
| Initial polymerization velocity (percent/hr.) | 2.3 | 2.7 | 10 | 25 | 32 |
| Weight percent of total rubber particles of particle size from 1 to 10μ | 1 50 | 75 | 90 | 80 | 2 45 |
| Impact strength (kg. cm./cm. notch) | 3.0 | 5.5 | 8.5 | 7.0 | 2.3 |

[1] Most particles more than 10μ.
[2] Most particles less than 1μ.

EXAMPLE 8

460 g. of butadiene-styrene copolymer latex (ratio of butadiene/styrene, 70:30, solid portion, 35%, average particle size, 0.5μ, gel content, 90%) and 500 g. of styrene were mixed, and a solution, prepared by dissolving 5 g. of magnesium sulfate in 200 cc. of water, was added thereto. This mixture was stirred for 5 minutes.

Thereafter, this mixture was charged into a dehydrator and dehydration of the mixture was carried out by centrifuging at 5,000 G.

The mixture thus obtained of rubber form polymer, monomer and remaining water was charged into the same bulk polymerization vessel as in Example 1, and the reaction mixture was heated at 120° C. until polymerization conversion reached 40% by weight (at a polymerization velocity of about 10%/hr.) and thereafter the polymerization was continued until termination by heating the polymerization system to 190° C. for 3 hours.

The remaining water was removed from the reflux condenser during polymerization. The impact strength of the obtained polymer was 5.5 kg. cm./cm. notch.

What we claim is:

1. A method for producing impact resistant rubber modified thermoplastic resin, wherein more than 70% by weight of rubber on the basis of total rubber component is dispersed as particles of 0.1 to 10μ which comprises the steps of:

(1) Mixing
(a) 100 parts by weight of diene type rubber polymer latex (based on the solid portion of latex) the monomer constituents of which consist of 60–100% by weight of at least one diene monomer represented by the general formula,

where R is H, —CH₃ or Cl and 40–0% by weight of a member selected from the group consisting of styrene, acrylonitrile, methyl methacrylate and mixtures thereof, wherein the particle size of said diene type rubber polymer is within the range of 0.05–1.0μ, the gel content of said rubber polymer exceeding 50% by weight;

(b) with 10–2000 parts by weight of a monomer consisting of 20–100% by weight of aromatic unsaturated monomer represented by the general formula,

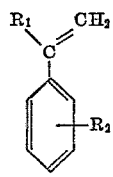

wherein R₁ is H or CH₃; R₂ is H, CH₃ or Cl and 80–0% by weight of non-aromatic unsaturated monomer represented by the general formula,

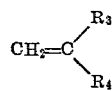

where R₃ is H or CH₃ and R₄ is CN or COOR₅ wherein R₅ is an alkyl radical having from 1 to 4 carbon atoms;

(2) extracting the diene type rubber polymer from said latex into said monomer phase to obtain two phases, one being a monomer phase in which said diene type rubber polymer particles are dispersed, and the other being a water phase, and taking off the water phase;

(3) pre-polymerizing the resulting composition of unsaturated monomer and diene type rubber polymer particles dispersed therein, by means of bulk polymerization at a rate of 2.5–30% by weight per hour until the conversion of the polymerization system reaches more than 10% by weight; and (4) completing the bulk polymerization.

2. The method according to claim 1 wherein in step (1)(b) said monomer consists of monomers represented by the general formula

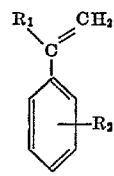

wherein R₁ is H or CH₃ and R₂ is H, CH₃ or Cl, and the prepolymerization is carried out by means of bulk polymerization at a rate of 2.5–30% by weight per hour until the conversion of the polymerization system reaches more than 10% by weight to control the coagulation of said diene type rubber polymer particles so that more than 70% by weight of the diene type rubber particles on the basis of total rubber in the impact resistant thermoplastic resin product are coagulated to the size of 1–10μ.

3. The method according to claim 1 wherein in step (1)(b) said monomer comprises a mixture consisting of from 60 to 95 parts by weight of at least one unsaturated monomer selected from the compounds represented by the general formula,

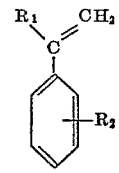

wherein R₁ is H or CH₃ and R₂ is H, CH₃, or Cl, and from 40 to 5 parts by weight of at least one unsaturated monomer selected from the compounds represented by the general formula

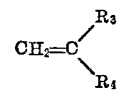

wherein R₃ is H or CH₃ and R₄ is CN or COOR₅, R₅ being an alkyl radical having from 1 to 4 carbon radicals, said diene type rubber polymer latex contains the rubber particles in a particular size range of 0.1 to 1.0μ, and the prepolymerization is carried out by means of bulk polymerization at a rate of 5.0–30% by weight per hour until the conversion of the polymerization system reaches more than 10% by weight to retain the original rubber particle size.

4. The method according to claim 3 wherein the diene type rubber latex contains rubber particles of 0.05 to 0.1μ, coagulating the rubber particles at the initial stage of the bulk polymerization so that more than 70% by weight of the rubber polymer becomes particles having a grain size of 0.1 to 1.0μ.

5. The method according to claim 1 which comprises first adding to 100 parts by weight of the diene type rubber latex 10 to 2000 parts by weight of at least one aromatic unsaturated monomer and after the extraction and the separation of water adding less than 500 parts by weight of at least one unsaturated monomer capable of being copolymerized with said aromatic unsaturated monomer.

References Cited

UNITED STATES PATENTS

| | | | |
|---|---|---|---|
| 3,370,105 | 2/1968 | De Bell et al. | 260—880 |
| 3,427,274 | 2/1969 | Cornell | 260—879 |
| 3,436,440 | 4/1969 | Abe | 260—880 |
| 3,446,873 | 5/1969 | Saito et al. | 260—880 |
| 3,663,655 | 5/1972 | Sturt | 260—880 |

FOREIGN PATENTS

| | | | |
|---|---|---|---|
| 564,274 | 10/1958 | Canada | 260—880 |

JAMES A. SEIDLECK, Primary Examiner

U.S. Cl. X.R.

260—879